(12) United States Patent
Tremblay et al.

(10) Patent No.: US 12,500,247 B2
(45) Date of Patent: Dec. 16, 2025

(54) METHOD OF MANUFACTURING A FLOW GUIDE FOR AN ELECTROCHEMICAL REACTOR

(71) Applicant: COMMISSARIAT A L'ENERGIE ATOMIQUE ET AUX ENERGIES ALTERNATIVES, Paris (FR)

(72) Inventors: Denis Tremblay, Grenoble (FR); Jean François Blachot, Grenoble (FR); Augustin Jouan, Grenoble (FR); Jean-Philippe Poirot-Crouvezier, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 1030 days.

(21) Appl. No.: 17/558,184

(22) Filed: Dec. 21, 2021

(65) Prior Publication Data

US 2022/0200016 A1    Jun. 23, 2022

(30) Foreign Application Priority Data

Dec. 21, 2020   (FR) .................................. 20 13832

(51) Int. Cl.
*H01M 8/0228* (2016.01)
*B41M 3/00* (2006.01)
(Continued)

(52) U.S. Cl.
CPC ............ *H01M 8/0228* (2013.01); *B41M 3/00* (2013.01); *C09D 11/52* (2013.01); *H01M 8/10* (2013.01)

(58) Field of Classification Search
CPC ........ H01M 8/0228; H01M 8/10; B41M 3/00; B41M 1/26; B41M 1/12; C09D 11/52
See application file for complete search history.

(56) References Cited

U.S. PATENT DOCUMENTS

2003/0198860 A1   10/2003 Yasumoto et al.
2010/0159362 A1   6/2010 Ito et al.
(Continued)

FOREIGN PATENT DOCUMENTS

CN   107394228 A   11/2017
CN   109638310 A   4/2019
(Continued)

OTHER PUBLICATIONS

JP2021148191A—Machine Translation (Year: 2021).*
(Continued)

*Primary Examiner* — Stewart A Fraser
*Assistant Examiner* — Patrick Marshall Greene
(74) *Attorney, Agent, or Firm* — Oblon, McClelland, Maier & Neustadt, L.L.P.

(57) ABSTRACT

The invention relates to a method for manufacturing at least one flow-guide (1, 1') for an electrochemical reactor, comprising the following steps:
   a) Providing a substrate (10),
   b) Providing a first mesh screen (11) comprising openings (111) configured to form a first pattern (21) of ribs (211) of a first flow-guide (1),
   c) Providing a second mesh screen (12) comprising openings (121) configured to form a second pattern (22) of ribs (221) of the first flow-guide (1).

The invention uses a mesh screen printing technique to produce fluidic circuits with a large channel depth and with an aspect ratio equal to or greater than 1.

15 Claims, 7 Drawing Sheets

(51) Int. Cl.
    *C09D 11/52*     (2014.01)
    *H01M 8/10*     (2016.01)

(56) References Cited

U.S. PATENT DOCUMENTS

| | | |
|---|---|---|
| 2011/0076590 A1 | 3/2011 | Kozakai et al. |
| 2013/0074716 A1 | 3/2013 | Ito et al. |
| 2018/0190998 A1 | 7/2018 | Maeda et al. |
| 2020/0083551 A1 | 3/2020 | Salomon et al. |

FOREIGN PATENT DOCUMENTS

| | | | |
|---|---|---|---|
| EP | 3 624 241 A1 | | 3/2020 |
| GB | 2 336 712 A | | 10/1999 |
| JP | 3580172 B2 | | 10/2004 |
| JP | 5135341 B2 | | 2/2013 |
| JP | 2021148191 A | * | 9/2021 |

OTHER PUBLICATIONS

French Preliminary Search Report issued Aug. 24, 2021 in French Application 2013832 filed on Dec. 21, 2020, citing documents AA-AD & AO-AQ therein, 9 pages (with English Translation of Categories of Cited Documents & Written Opinion).

* cited by examiner

METHOD OF MANUFACTURING A FLOW GUIDE FOR AN ELECTROCHEMICAL REACTOR

TECHNICAL FIELD

The present invention relates to the optimisation of the manufacture of at least one component of an electrochemical reactor such as a fuel cell. More particularly, it relates to making of printed fluidic circuits in the context of manufacture of electrochemical cells intended in particular for use in a fuel cell, and in particular for use in a fuel cell at a temperature lower than 250° C.

PRIOR ART

For example, fuel cells are considered as an electrical supply system for motor vehicles intended to be produced on a large scale in the future, as well as for a large number of other applications. A fuel cell is an electrochemical device that converts chemical energy directly into electrical energy. A combustible such as dihydrogen or methanol is used as a fuel of the fuel cell.

Proton-exchange membrane fuel cells, called PEM, operate at low temperature, typically lower than 250° C. and have particularly interesting compactness properties.

Principle of the Fuel Cell

The fuel cell is an electrochemical generator that allows converting chemical energy into electrical energy through an oxidation-reduction reaction.

Figure 1:
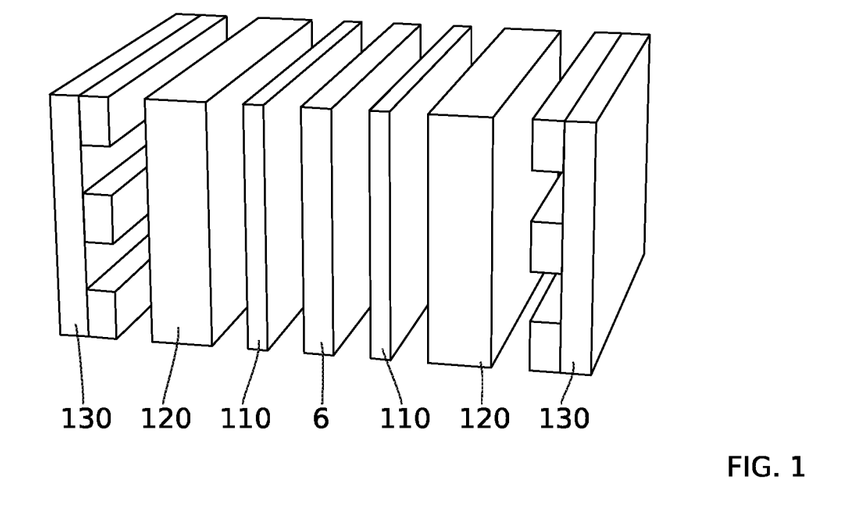
FIG. 1 schematically represents an exploded perspective view of a portion of an electrochemical reactor according to an embodiment of the prior art.

Referring to the appended FIG. 1, the electrochemical core 5 of the cell is formed by two electrodes 110 separated by an ion-exchange membrane 6. The electrodes 110 are fed with an appropriate reagent, respectively a combustible for the anode and a comburent for the cathode, thereby creating an electrochemical reaction at the surface of the electrodes 110 which will allow generating the electric current.

Figure 2:
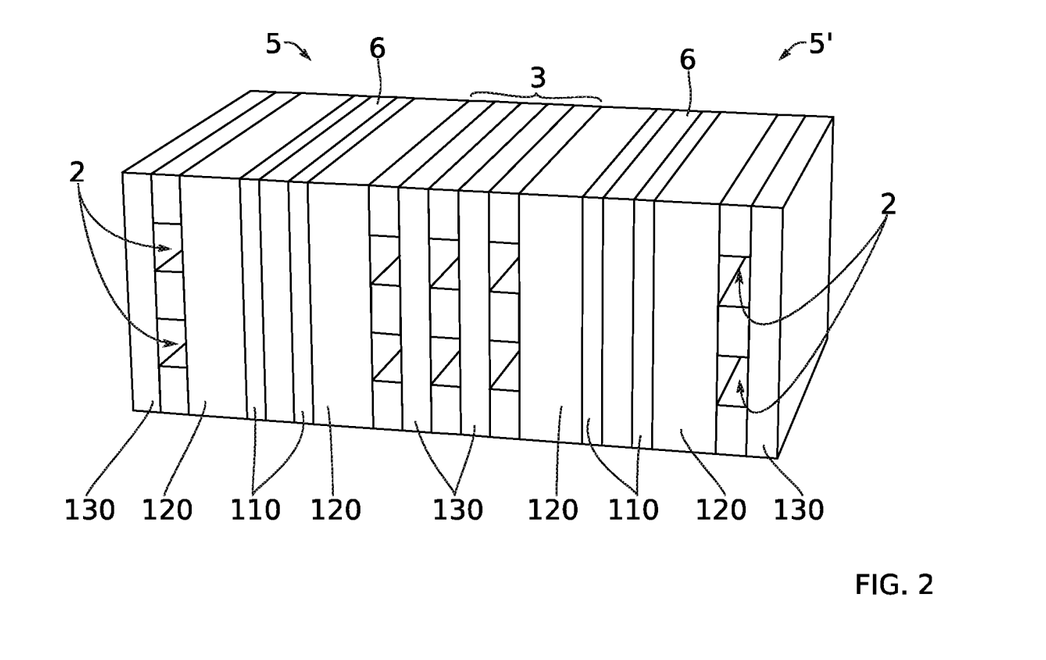
FIG. 2 schematically represents an assembled perspective view of a stack of two portions of an electrochemical reactor according to its embodiment illustrated in FIG. 1.

Referring to FIG. 2, the fuel cell may be formed by a stack of electrochemical cores 5, 5' mounted in series, called "stack". Between each stack of electrochemical cores 5, 5', a bipolar plate 3 may be formed to allow supplying the electrodes 110 with reagents. Hence, the fuel cell may be formed by a stack of unit cells separated in pairs by a bipolar plate 3.

More particularly, a proton-exchange membrane fuel cell or PEMFC ("Proton Exchange Membrane Fuel Cell") comprises at least one unit cell containing a membrane-electrodes assembly or MEA (110/6/110), formed by an electrolytic membrane 6 enabling the selective passage of the protons and, throughout this membrane 6, the electrodes 110.

In general, the membrane 6 is made of a perfluorosulfonate ionomer such as Nafion®. The electrodes 110, also called catalytic or active layers, contain a catalyst, advantageously platinum (Pt), supported by carbon, and possibly an ionomer, in general the same as that forming the membrane 6.

At the level of the anode, dihydrogen (H2), used as a fuel, is oxidised to produce protons crossing the membrane 6. The electrons produced by this reaction migrate towards the fluidic circuit, and then cross an electrical circuit external to the cell 5 to form an electric current. At the level of the cathode, oxygen (O2) is reduced and reacts with the protons having crossed the membrane 6 to form water.

Gas-diffusion layers 120 or GDL ("Gas Diffusion Layer"), conventionally made of graphite fibers, may interposed between the electrodes 110 and the bipolar plates 3.

Principle of a Bipolar Plate

The bipolar plate 3 ensures several functions, among which in particular:
- the distribution of the reagents and the evacuation of the formed byproducts, possibly via channels 2 and/or orifices formed therewithin;
- the transfer of the electrons generated at the anodes of the different unit cells 5, which implies that the bipolar plate 3 is electrically-conductive;
- the cooling of the unit cells 5, possibly through the circulation of a cooling liquid therewithin;
- a mechanical support for the electrochemical core 5.

Figure 3:
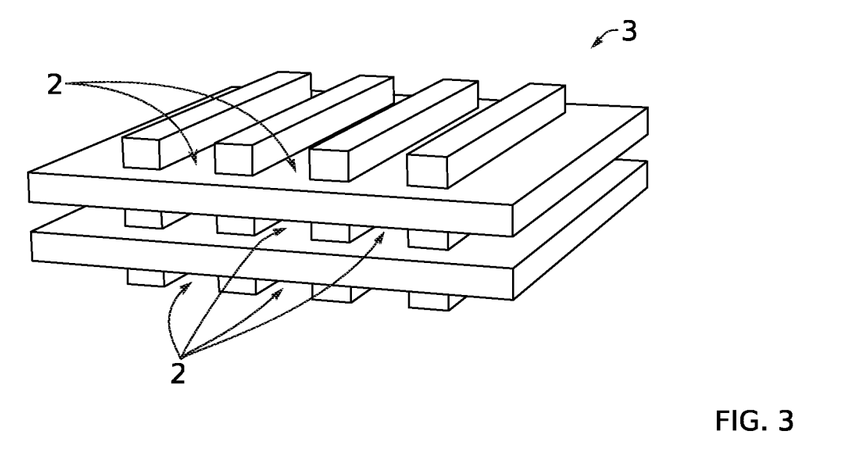
FIG. 3 represents a perspective view of at least one portion of a bipolar plate intended to be located between two electrochemical cores of an electrochemical reactor according to its embodiment illustrated in FIG. 1.

It is possible to consider the typical case of a bipolar plate 3 as illustrated in FIG. 3 comprising three fluidic circuits, respectively dedicated to guidance of the flows of the anode fluid, of the cathode fluid and of the cooling fluid (at the centre of the plate). The guidance of the flows is achieved through the set-up of obstacles, called ribs hereinbelow, such as walls or studs, which affect the flow of the fluid. For example, these ribs may be in the form of a bundle of parallel channels 2, which is herein called "fluidic circuit". These ribs achieving the electrical and thermal connection with the cell core, they should be electrically-conductive.

In general, each fluidic circuit of a fuel cell is made of a current-conductive material which could be graphite, a plastic reinforced with carbon fibers, or a metal, such as stainless steel, a metallic alloy or any other current-conductive material. The cathode and anode fluids are distributed over the entirety of the active surface of each electrode by the channels 2 of the fluidic circuits, each fluidic circuit comprising an inlet to enable the feed-in of the fluid and an outlet to enable the evacuation of the non-reagent fluid and of the byproducts of the electrochemical reactions.

To date, the channels 2 of the fluidic circuit are still made primarily by machining or forming from an electrically-conductive plate 130. In the first case, the matter is removed and, in the second case, the channels 2 are created by deformation of the electrically-conductive plate 130. The channels 2 of the plate are designed so as to control the pressure drop of the flows that circulate therein.

More particularly, each fluidic circuit used in the proton-exchange membrane fuel cell is primarily made of a stamped metal for reasons relating to costs, bulk and performances. In general, the thickness of the electrically-conductive plate 130 is comprised between 1 and 4 mm and the channels 2 preferably have a width comprised between 0.2 and 2 mm, a depth comprised between 0.2 and 0.5 mm, and a spacing (or tooth width) comprised between 0.2 and 2 mm. The diffusion surface of the fluids is variable depending on the dimension of the cell and the desired power. For high-power applications, a circuit for cooling the fluids is generally inserted between the diffusion surface of hydrogen at the anode and the diffusion surface of oxygen (or of air) at the cathode. Stacking of fluidic circuits on two levels, and possibly on three levels (as represented in FIG. 3), forms a bipolar plate 3.

Nevertheless, the fluidic circuit obtained by sheet metal stamping has some drawbacks, among which in particular:
- a complicated making method and a production cost that still remains high, in particular for low production volumes;
- the camber of the plate 130 caused by forming which makes the deposition of seals to guarantee sealing of the cell 5 complicated;

the difficulty to reduce even further the thickness of the plate 130 and its weight, already very optimised, which considerably affect the volume and mass energy density of the fuel cell; and the difficulty to reduce the width of the channels 2 in order to improve the performances of the cell, because of the limits of forming the used sheet metals.

In order to simplify the manufacturing method and reduce the cost of the bipolar plates, which represents approximately 40% of the overall cost of the fuel cell, the solutions implemented in the prior art have consisted in particular in making obstacles to the flow by printing over a metallic or composite planar substrate so as to form a flow-guide, and then the bipolar plate from at least two flow-guides. Alternatively, this method allows making the fluidic circuit over the gas-diffusion layer 120, outside the bipolar plate 3.

Other arrangements of the fluidic circuits, not detailed herein, are possible. For example, a bipolar plate 3 may comprise only two fluidic circuits, respectively dedicated to each of the two reagents. Moreover, a bipolar plate 3 comprising two or three fluidic circuits may be formed by several separate subsets, each comprising at least one fluidic circuit. A bipolar plate 3 having the previously-described functions is then formed at the time of assembly of the cell, when the cells are stacked and a compressive load is applied thereto.

Making of Printed Fluidic Circuits

Figure 4:
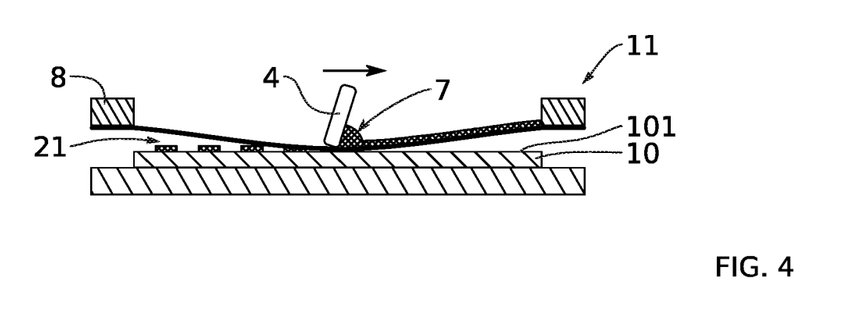
FIG. 4 is a schematic sectional side view of a step of printing by screen-printing for the formation of a print pattern.

Referring to FIG. 4, printing of conductive fluidic circuits is done thanks to the use of a screen-printing mask 11, 12 containing the image of the fluidic circuit to be printed. A conductive ink 7 with a very high thixotropy is passed through this mask 11, 12 and printing allows depositing patterns 21, 22 of ribs, also called teeth, over the face 101 of a substrate 10, so as to obtain a conductive fluidic circuit.

More particularly, screen-printing with a mesh screen is based on the use of a mask or screen 11, 12 formed by two main components: a meshing ("mesh") and an emulsion. The meshing, stretched inside a frame 8, is the mechanical support of the screen 11, 12. Its porosity is defined so that it could be easily crossed by the ink. The emulsion is a deposition carried out over the meshing, and impregnating the meshing at the location of its deposition, so as to form an ink-tight layer 7. The voids present in this emulsion layer are intended to be filled with the ink 7 at the time of screen-printing. The thickness of the emulsion layer largely determines the thickness of the deposited ink layer.

For material reasons, it is impossible to print by 'mesh' screen-printing deposits having a thickness larger than 200 μm, because it is the maximum emulsion thickness that could be deposited by manufacturers of 'mesh' screen printing masks. Indeed, by depositing a thicker emulsion, the contact surface between the ink and the emulsion becomes larger, while the contact surface between the meshing and the emulsion remains the same. Thus, with an emulsion thickness larger than 200 μm, there is a risk of a poor hold of the emulsion to the meshing as well as a risk of poor hold of the ink over the substrate. This reasoning remains the same for any print with a shape factor greater than 0.5, because, in the case of a greater shape ratio, we will have a too large contact surface between the ink and emulsion in comparison with that between the meshing and the emulsion.

Printing by screen-printing has been used since many years to manufacture conductive fluidic circuits intended for a use in PEMFC. Different patent documents have provided more or less detailed descriptions of the printing possibilities in terms of height and width. Information has also been given on the nature (solvent, conductive material . . . ) and the properties (viscosity, flow threshold) of the inks used to make these fluidic circuits.

All of these documents claim that printing of fluidic circuits by screen-printing has a problem relating to the height of printed teeth (the specified maximum height that could be reached is between 200 and 400 μm). For the time being, the manufacturers of masks still cannot exceed a shape factor (printed height/width) of 1, most screen-printing masks having a shape factor of 0.5 (corresponding for example to a tooth width of 400 μm for a height of 200 μm).

Some use the technique of printing in several layers, or multilayers, to increase this height, without describing the making method in detail. This technique does not allow increasing the height of the printed deposit indefinitely. Indeed, as soon as the substrate 10 is no longer planar, but includes at least one first print of ribs, the latter partially fills, in the mask, the space usually intended to receive the ink. Each successive deposit accentuates this phenomenon, and thickness of the deposited layers rapidly becomes negligible.

The problem with this limited print height is that the smaller the depth of the channels 2 of the fluidic circuit, the more the circuit will cause pressure drops and thus make the cell less efficient. Yet, in the case of printed circuits, there is a considerable interest in reducing the width of the tooth/channel step, which will ineluctably reduce the depth of the channels 2 since this is limited by a shape factor of 1, at most, or 0.5 in most cases. For example, if the desired channel 2 width is 100 μm, it will be impossible with the current technology to exceed a channel depth of 100 μm. In the PEM application, a fluidic circuit having channel 2 width and depth that are both equal to 100 μm would cause too much pressure drops to be usable.

Hence, an object of the present invention is to provide a method for manufacturing printed fluidic circuits which allows overcoming at least one of the drawbacks of the prior art. More particularly, an object of the present invention is to provide a method for manufacturing printed fluidic circuits which allows reducing the width of the tooth/channel step of the fluidic circuits.

The other objects, features and advantages of the present invention will appear upon examining the following description and the appended drawings. It should be understood that other advantages could be incorporated.

SUMMARY

To achieve this objective, a first aspect of the invention relates to a method for manufacturing at least one flow-guide for an electrochemical reactor, comprising the following steps:

a. providing a substrate, b. providing a first mesh screen comprising openings configured to form a first pattern of ribs of a first flow-guide, c. providing a second mesh screen comprising openings configured to form a second pattern of ribs of the first flow-guide, the second pattern being such that, when the second mesh screen is superimposed with the first mesh screen, the openings of the second mesh screen can be positioned so that each is located simultaneously with the others, in line with an opening of the first mesh screen and the openings of the second mesh screen having a reduced surface in comparison with the openings of the first mesh screen; then On a first face of the substrate:
d. printing a first layer of a first electrically-conductive ink by screen-printing using a first mesh screen,
e. forming the first pattern of ribs by drying the first layer,
f. positioning the second mesh screen so that it partially rests over each of the ribs of the first pattern, each opening of the second mesh screen being positioned in line with a rib of the first pattern, then
g. printing a second layer of a second electrically-conductive ink by screen-printing using the second mesh screen as positioned before,
so as to obtain a superimposition of the second pattern over the first pattern after drying of the second layer.

Thus, the invention is based on an innovative use of the printing technique by mesh screen-printing to make fluidic circuits with a significant channel depth (>200 μm) and with a shape ratio equal to or higher than 1. Indeed, thanks to the use of two different printing masks or mesh screens, it is possible to make, very simply and for a very low additional cost (only one additional screen-printing mask) printed fluidic circuits with a tooth height exceeding 200 μm and having a shape ratio equal to or higher than 1.

A second aspect of the invention relates to a method for manufacturing a bipolar plate for an electrochemical reactor, and in particular for a proton-exchange membrane fuel cell, comprising:
the manufacture, by a manufacturing method according to the first aspect of the invention, of at least three flow-guides on at least two substrates, and
at least one assembly of said at least two substrates together so that the assembly has one of said at least three flow-guides between two of said at least two substrates and two other ones of said at least three flow-guides on either side of said at least two substrates.

A third aspect of the invention relates to a flow-guide for an electrochemical reactor, and in particular for a proton-exchange membrane fuel cell, obtained by implementing the manufacturing method according to the second aspect of the invention.

A fourth aspect of the invention relates to a bipolar plate for an electrochemical reactor, and in particular for a proton-exchange membrane fuel cell, obtained by implementing the manufacturing method according to the second aspect of the invention.

According to others of its aspects, the invention may relates to at least one amongst:
A flow-guide for an electrochemical reactor, for example obtained by implementing the method according to the first aspect of the invention, comprising a substrate over at least one of the two faces of which extend ribs defining flow channels, the ribs being made based on at least one material different from the material based on which the substrate is made and/or having a thickness strictly larger than a width of the flow channels;
A flow-guide as introduced hereinabove, wherein each rib extends from the at least one of the two faces of the substrate by at least one first portion with a thickness substantially equal to the width of the flow channels and made based on a first conductive material and a second portion extending from the first portion, with a reduced width in comparison with the width of the first portion of each rib and made based on a second conductive material, where appropriate the second conductive material being different from the first conductive material;
A flow-guide according to the previous feature, wherein each rib further comprises a third portion extending from at least one side, preferably from two sides, of the second portion, until covering, where appropriate, the second portion, the third portion preferably having a width substantially equal to the width of the first portion and/or preferably extending in line with the first portion, the third portion being made based on a third conductive material, where appropriate the third conductive material being different from at least one amongst the first conductive material and the second conductive material;
A bipolar plate for an electrochemical reactor, and in particular for a proton-exchange membrane fuel cell, comprising at least three flow-guides as introduced hereinabove over at least two substrates assembled together so that the assembly has one of said at least three flow-guides between two of said at least two substrates and two other ones of said at least three flow-guides on either side of said at least two substrates; and
A bipolar plate for an electrochemical reactor, and in particular for a proton-exchange membrane fuel cell, comprising at least two flow-guides as introduced hereinabove over at least one substrate so as to have one of said at least two flow-guides over a first face of said at least one substrate and one of said at least two flow-guides over a second face of said at least one substrate.

BRIEF DESCRIPTION OF THE FIGURES

The aims, objects, as well as the features and advantages of the invention will appear better from the detailed description of an embodiment of the latter which is illustrated by the following appended drawings wherein.

The drawings are provided as examples and do not limit the invention. They form schematic principle representations intended to facilitate the understanding of the invention and are not necessarily to the scale of the practical applications. In particular, the thicknesses and widths of the different illustrated elements are not necessarily representative of reality or of realistic shape factors.

DETAILED DESCRIPTION

Before starting a detailed review of embodiments of the invention, optional features that could possibly be used in combination or alternatively are set out hereinafter.

According to an example of the first aspect of the invention, the openings of the second mesh screen are configured and positioned so as to be able to be substantially centred on the ribs of the first pattern when positioning the second mesh screen.

According to another example of the first aspect of the invention, the first electrically-conductive ink and the second electrically-conductive ink are identical.

According to an optional feature of the first aspect of the invention, the manufacturing method as introduced hereinabove may further comprise the following steps:

h. positioning the first mesh screen so that it partially rests over each of the ribs of the second pattern, the openings of the first mesh screen being partially occupied by at least one portion of the ribs of the second pattern, and preferably substantially centred on the ribs of the second pattern, and i. printing a third layer of a third electrically-conductive ink by screen printing using the first mesh screen as positioned before, so as to obtain an enlargement of the ribs of the second pattern and consequently enlarged ribs, after drying of the third ink layer.

Thus, no tradeoff is necessary on the involved electrical conduction surface or on the mechanical strength of the ribs.

According to the previous optional feature, the manufacturing method according to the first aspect of the invention may further comprise at least one once the sequence of the following steps:

j. positioning the second mesh screen so that it partially rests over each of the enlarged ribs, then k. printing another layer of an electrically-conductive ink by screen-printing using the second mesh screen as positioned before, so as to obtain, after drying, a superimposition of the second pattern over the enlarged ribs, then l. positioning the first mesh screen so that it partially rests over each of the ribs of the second pattern printed before, the openings of the first mesh screen being partially occupied by at least one portion of the ribs of the second pattern superimposed with the enlarged ribs, and preferably substantially centred on said ribs of the second pattern, and m. printing another layer of an electrically-conductive ink by screen-printing using the first mesh screen as positioned before, so as to obtain, after drying, an enlargement of the ribs of the second pattern and consequently new enlarged ribs.

According to the previous example, each mesh screen comprising a meshing and an emulsion, the first mesh screen is positioned over the second pattern so that a portion of its meshing rests over each of the ribs of the second pattern.

Alternatively to the optional feature introduced hereinabove, the method may further comprise:

providing at least one third mesh screen comprising openings configured to form a third pattern of ribs of the first flow-guide, the third pattern being such that, when said at least one third mesh screen is superimposed with a mesh screen used before, the openings of said at least one third mesh screen can be positioned so that each is located, simultaneously with the others, in line with an opening of the mesh screen used before and the openings of said at least one third mesh screen having a reduced surface in comparison with the openings of the mesh screen used before positioning said at least one third mesh screen so that it partially rests over each of the ribs of the pattern formed before, each opening of said at least one third mesh screen being positioned in line with a rib of the pattern formed before, then printing at least one third electrically-conductive ink layer by screen-printing using said at least one third mesh screen as positioned before, so as to obtain a superimposition of the third pattern over the pattern formed before after drying of said at least one third layer. Preferably, the openings of said at least one third mesh screen are configured and positioned so as to be able to be substantially centred on the ribs of the pattern formed before when positioning said at least one third mesh screen. According to one example, the second electrically-conductive ink and the third electrically-conductive ink are identical.

According to an example of the first aspect of the invention, the surface difference between the openings of the second mesh screen and the openings of the first mesh screen is such that, when the second mesh screen is positioned over the first pattern, the second mesh screen rests over 5 to 20% of an upper surface of the ribs of the first pattern.

According to another example of the first aspect of the invention, the surface difference between the openings of the second mesh screen and the openings of the first mesh screen comprises, and possibly consists of, a width difference between the openings of the second mesh screen and the openings of the first mesh screen which is substantially larger than 40 µm, the openings of the second mesh screen being even more preferably substantially centred on the ribs of the first pattern, when the second mesh screen is positioned over the first pattern, as the width difference between the openings of the second mesh screen and the openings of the first mesh screen is close to its minimum value.

According to another example of the first aspect of the invention, each mesh screen comprising a meshing and an emulsion, the second mesh screen is positioned over the first pattern, so that a portion of its emulsion partially rests over each of the ribs of the first pattern.

According to another example of the first aspect of the invention, each mesh screen comprising a meshing and an emulsion, the emulsion has a thickness substantially comprised between 100 and 200 µm, preferably substantially comprised between 150 and 200 µm, and still more preferably substantially equal to 200 µm, and/or the meshing has a thickness substantially comprised between 50 and 150 µm, preferably substantially comprised between 80 and 120 µm, and still more preferably substantially equal to 100 µm.

According to another example of the first aspect of the invention, the first mesh screen comprising a meshing and an emulsion, the emulsion of the first mesh screen having a pattern which is the negative of the first pattern and which defines flow channels of the first guide between the ribs of the first pattern whose width is defined by the openings of the first mesh screen, the width of the flow channels is substantially comprised between 1 and 4 times the width of the ribs of the first pattern, preferably substantially comprised between 1 and 2 times the width of the ribs of the first pattern, and still more preferably substantially equal to the width of the ribs of the first pattern.

According to another example of the first aspect of the invention, each printing by screen-printing of each layer of electrically-conductive ink is carried out while applying a shear stress on this layer, the viscosity of the printed ink being comprised between 70 and 500 Pa·s for a shear rate of 0.1 s$^{-1}$, and the viscosity of the printed ink being comprised between 2.5 and 7 Pa·s for a shear rate of 100 s$^{-1}$. A conductive ink having these characteristics is said having a very high thixotropy.

According to another example of the first aspect of the invention, the provided substrate comprises at least one amongst a gas-diffusion layer of the electrochemical reactor, an electrode layer of the electrochemical reactor and an electrically-conductive plate.

According to another example of the first aspect of the invention, the provided substrate being an electrically-conductive plate, steps d to g of the method are repeated on the second face of the substrate to manufacture a second flow-guide therein. Complementarily, steps h and i, and possibly h to m, may be repeated on the second face of the substrate to manufacture the second flow-guide therein.

By a first element "superimposable" with a second element, it should be understood that a projection of the first element in a superimposition plane between the elements is entirely inscribed within a projection of the second element in the same superimposition plane, and vice versa.

By a parameter "substantially equal to/higher than/lower than" a given value, it should be understood that this parameter is equal to/higher than/lower than the given value, within 20%, and possibly 10%, of this value. By a parameter "substantially comprised between" two given values, it should be understood that this parameter is at least equal to the given lowest value, within 20%, and possibly 10%, of this value, and at most equal to the given highest value, within 20%, and possibly 10%, of this value.

To address the problem of print height by mesh screen-printing, in particular for the manufacture of a flow-guide dedicated to a PEM application, a technique has been imagined and implemented: pyramidal printing.

This pyramidal printing is carried out by implementing the method for manufacturing at least one flow-guide for an electrochemical reactor according to the first aspect of the invention.

Referring to FIGS. 4 and 5A to 5C, the method according to the first aspect of the invention firstly comprises the following steps:
Providing a substrate 10,
Providing a first mesh screen 11 comprising openings 111 configured to form a first pattern 21 of ribs 211 of a first flow-guide 1, and
Providing a second mesh screen 12 comprising openings 121 configured to form a second pattern 22 of ribs 221 of the first flow-guide 1.

Figures 5A, 5B:
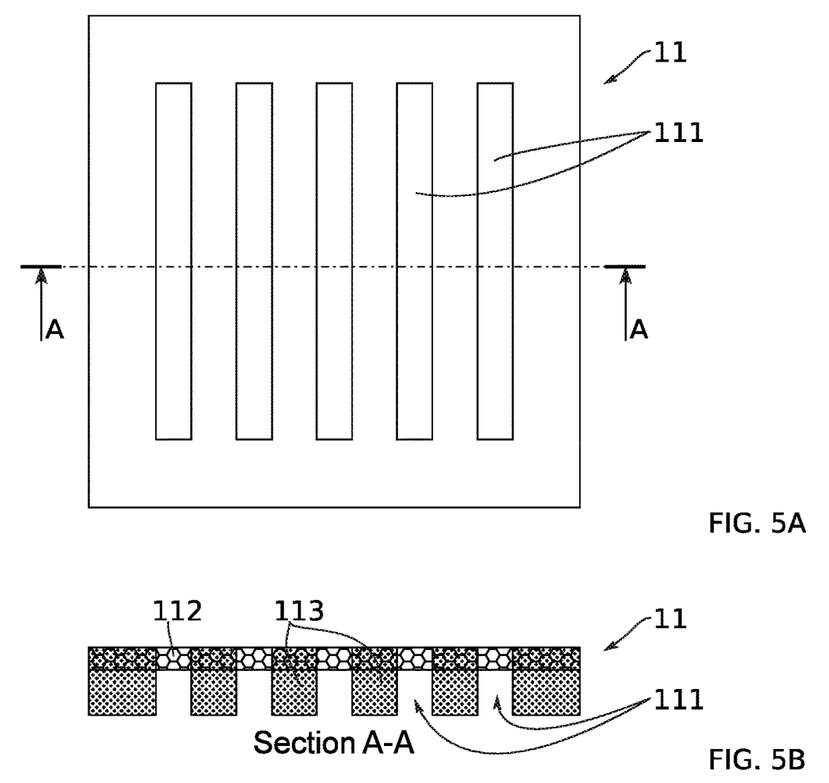
FIG. 5A schematically represents a top view of the first mesh screen implemented during the method for manufacturing a flow-guide according to the first aspect of the invention.
FIG. 5B schematically represents a sectional view, according to a plane comprising the axis A-A illustrated in FIG. 5A, of the first mesh screen as illustrated in FIG. 5A.
Figure 5C:
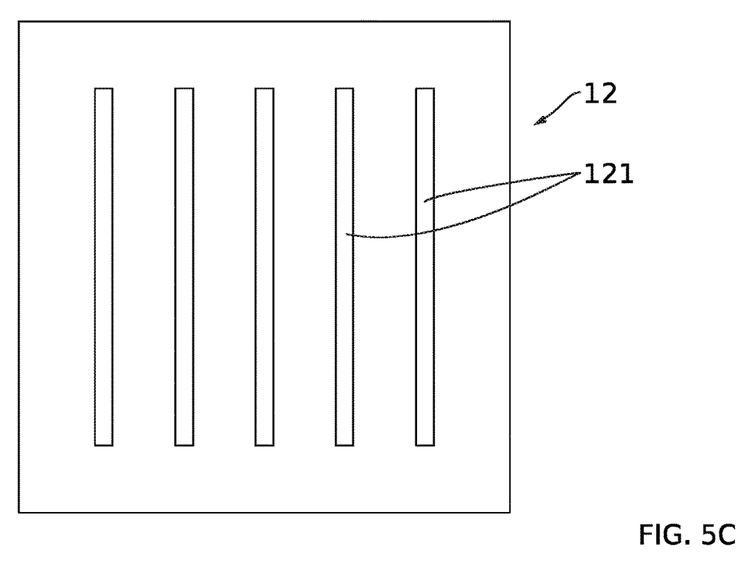
FIG. 5C schematically represents a top view of the second mesh screen implemented during the method for manufacturing a flow-guide according to the first aspect of the invention.

Each mesh screen 11, 12 comprises a meshing 112, 122 and an emulsion 113, 123. Typically, each emulsion 113, 123 has a thickness substantially comprised between 100 and 200 µm, preferably substantially comprised between 150 and 200 µm, and still more preferably substantially equal to 200 µm; each meshing 112, 122 has a thickness substantially comprised between 50 and 150 µm, preferably substantially comprised between 80 and 120 µm, and still more preferably substantially equal to 100 µm. Nonetheless, the invention is not limited to such values of the emulsion and/or meshing thickness. Furthermore, other parameters, such as the mesh size of each meshing, could be considered.

In FIG. 5B, it is observed that the openings 111 of the first mesh screen 11 correspond to areas of the first mesh screen 11 that are not covered with the emulsion 113. At its openings 111, it is also observed that the meshing 112 of the first mesh screen 11 is not soaked with emulsion 113. Hence, the ink to be printed via this screen 11 will pass through the meshing 112 and fill the spaces left empty by the emulsion 113.

The second mesh screen 12 has a corresponding structure. Nonetheless, the second pattern 22 is superimposable with the first pattern 21 and the openings 221 of the second mesh screen 12 have a reduced surface in comparison with the openings 211 of the first mesh screen 21.

In other words, if we cut FIGS. 5A and 5C, superimpose them on top of each other (with the openings directed in the same direction) and observe the obtained superimposition by transparency, we notice that each opening 121 of the second mesh screen 12 is inscribed within an opening 111 of the first mesh screen 11. In the example illustrated in FIGS. 5A and 5C, only the ends of the openings 111 and 121 coincide with each other, since the openings 121 of the second mesh screen 12 are longitudinally centred with respect to the openings 111 of the first mesh screen 11. Indeed, the superimposition of FIGS. 5A and 5C on top of each other would show that the longitudinal shape of each opening 111 has, along its length, a median coincident with that of the longitudinal shape of the opening 121 with which it is superimposed.

The openings 111 and 121 having the same length, the surface difference between the openings 121 of the second mesh screen 12 and the openings 111 of the first mesh screen 11 consists of a width difference between the openings 121 of the second mesh screen 12 and the openings 111 of the first mesh screen 12. Preferably, this difference is preferably larger than 40 µm. Furthermore, the openings 121 of the second mesh screen 12 are even more preferably substantially centred on the openings 111 of the first mesh screen 11, as the width difference between the openings 121 of the second mesh screen 12 and the openings 111 of the first mesh screen 11 is close to its minimum value, namely substantially 40 µm.

More particularly, the second printed layer 32 is preferably less wide than the first one 31, by at least 20 µm on each side, typically by 50 µm on each side, for the second mesh screen 12 to have enough support to bear in a stable manner on the ribs 211 of the first pattern 21.

More generally, it is preferred that the surface difference between each opening 121 of the second mesh screen 12 and each opening 111 of the first mesh screen 11, with which it is superimposed namely comprised between 5% and 20% of a surface of the opening 111. In this manner, it is ensured that the second mesh screen 12 has a support to bear in a stable manner on the ribs 211 of the first pattern 21, whether the openings 111 and 121 could be centred on top of each other, or not.

It should be noted herein that the openings 111 and 121, as well as the ribs 211 and 221, are limited neither to a straight shape, nor to a parallel distribution.

More particularly, three modes of circulation of the reagents or of a cooling liquid in the flow channels 2 could essentially be distinguished:
  the serpentine channels: one or several channel(s) run(s) over the entirety of the active area in several back-and-forth runs;
  the parallel channels: a bundle of parallel and open-through channels runs throughout the active area; and
  the interdigitated channels: a bundle of parallel and plugged channels runs throughout the active area. Each channel is plugged either on the inlet side, or on the fluid outlet side. The fluid coming inot a channel is then constrained to locally cross the gas-diffusion later to join an adjacent channel and afterwards reach the fluid outlet of this adjacent channel.

The manufacturing method according to the first aspect of the invention is suited for the manufacture of flow-guides 1 at least according to any one of the three circulation modes set out hereinabove.

Figure 6:
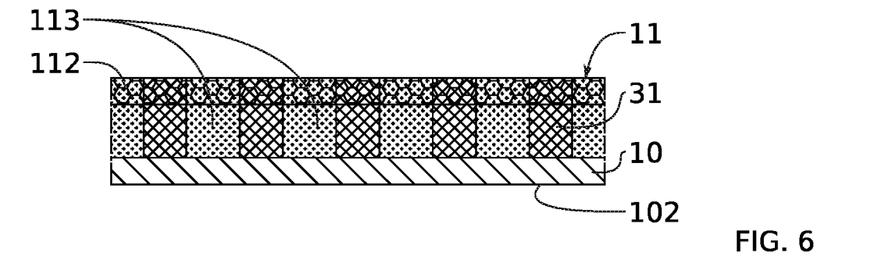
FIGS. 6 to 11 schematically represent the sectional views illustrating different steps of an embodiment of the method for manufacturing a flow-guide according to the first aspect of the invention.
Figure 7:
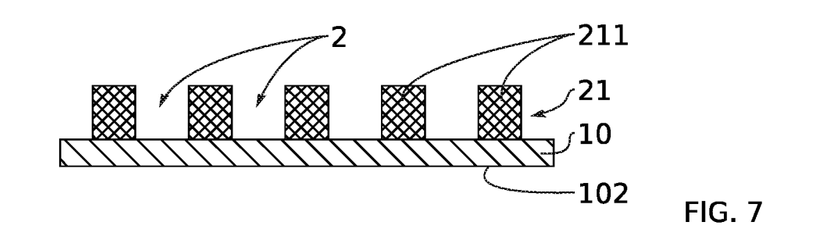

Referring to FIGS. 6 to 9, the manufacturing method according to the first aspect of the invention further comprises the following steps, carried out on a first face 101 of the substrate 10:
  Printing a first layer 31 of a first electrically-conductive ink by screen-printing using the first mesh screen 11, for example as illustrated in FIG. 6,
  Forming the first pattern 21 of ribs 211 by drying of the first layer 31, for example as illustrated in FIG. 7,
  Positioning the second mesh screen 12 so that it partially rests over each of the ribs 211 of the first pattern 21, then
  Printing a second layer 32 of a second electrically-conductive ink by screen-printing using the second mesh screen 12 as positioned before, for example in the manner illustrated in FIG. 8.

Figure 9:
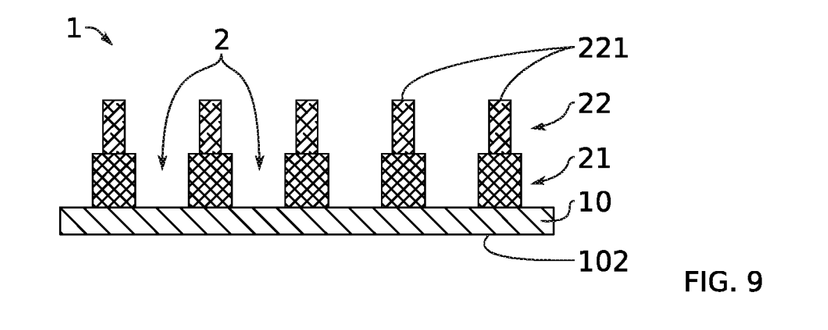

Thus, a superimposition of the second pattern 22 over the first pattern 21 is obtained after drying of the second layer 32, for example as illustrated in FIG. 9.

It should be noted herein that, according to the example illustrated in FIGS. 5A and 5C wherein each opening 111 and each opening 121 that is superimposed with it could be centred with each other, when the first and second mesh screens 11 and 12 are superimposed with each other, the openings 121 of the second mesh screen 12 are configured and positioned so as to be substantially centred on the ribs 211 of the first pattern 21 when positioning the second mesh screen 12 over the ribs 211 of the first pattern 21.

Thus, it turns out that the implementation of the method according to the first aspect of the invention actually enables a pyramidal-type printing wherein the conductive ink layer 32 to be printed over the already existing layer 31 is less wide. The second screen 12, resting, during printing of the second layer 32, over the ribs 211 of the first pattern 21, and not over the substrate 10, is located, during printing of the second layer 32, at a distance substantially equal to the thickness of the ribs 211 of the first pattern 21 with respect to the substrate 10, which will allow gaining some printable height.

Figure 8:
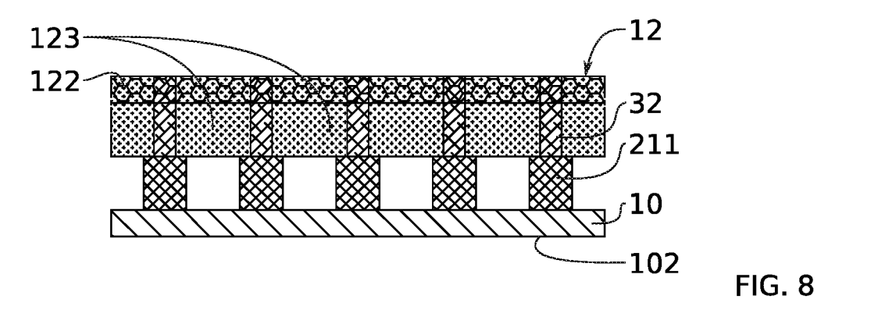

It should be noted that, as illustrated in FIG. 8, the second mesh screen 12 rests more particularly over a portion of each of the ribs 211 of the first pattern 21, and in particular over a portion of their tops, through a portion of its emulsion 123.

Where appropriate, it is possible to manufacture, thanks to a particular embodiment of the method according to the first aspect of the invention, a pyramidal print with more than two levels.

To this end, the method according to the first aspect of the invention may further comprise the following steps:
  providing a third mesh screen comprising openings configured to form a third pattern of ribs of the first flow-guide 1,
  the third pattern being superimposable with the second pattern 22 and the openings of the third mesh screen being a reduced surface in comparison with the openings 121 of the second mesh screen 12,
  positioning the third mesh screen so that it partially rests over each of the ribs 221 of the second pattern 22, then
  printing a third electrically-conductive ink layer by screen-printing using the third mesh screen as positioned before, so as to obtain a superimposition of the third pattern over the second pattern 22 after drying of the third layer.

As in the example illustrated in FIGS. 5A and 5C, it is further possible that the openings of the third mesh screen are configured and positioned so as to be able to be substantially centred on the ribs 221 of the second pattern 22 when positioning the third mesh screen over the ribs 221 of the second pattern 22.

This pyramidal growth operation is renewable as many times as desired, as long as the last printed layer is wide enough to support a new layer (typically as long as the width of the last printed layer is substantially larger than 200 μm) and as long as screen-printing masks with a finer size are available.

Such a pyramidal growth features a gain in terms of speed of implementation of the manufacturing method by limiting the number of printing steps (possibly, there are no steps of enlarging the ribs formed before) without any tradeoff on the height of the formed ribs, the narrower top levels compensating, where appropriate, for the disadvantage that exists in the context of such a pyramidal growth, starting from a base which, having to be wide enough to support at least two levels, necessarily reduces the fluid passage section in the channels at its level.

Figure 10:
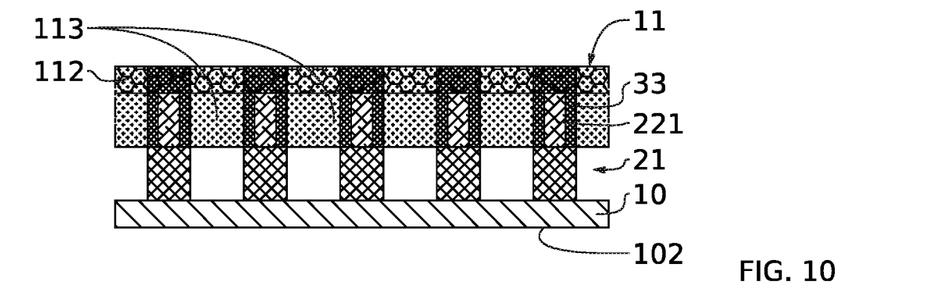

However, while a pyramidal print with more than two levels is made possible by the manufacturing method according to the first aspect of the invention, it could, more advantageously, be considered that, starting from the configuration illustrated in FIG. 9, the method according to the first aspect of the invention further comprises, for example as illustrated in FIG. 10, the following steps:
  Positioning the first mesh screen 11 so that it partially rests over each of the ribs 221 of the second pattern 22, the openings 111 of the first mesh screen 11 being partially occupied by at least one portion of the ribs 221 of the second pattern 22, and being preferably substantially centred on the ribs 221 of the second pattern 21, and
  Printing a third layer 33 of a third electrically-conductive ink by screen-printing using the first mesh screen 11 as positioned before.

Figure 11:
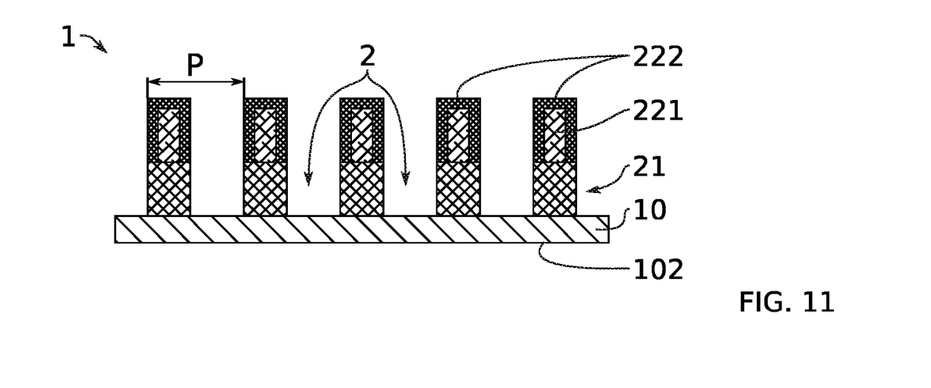

In this manner, an enlargement of the ribs 221 of the second pattern 22 is obtained and consequently enlarged ribs 222, after drying of the third ink layer 32, for example as illustrated in FIG. 11.

It should be noted that, as illustrated in FIG. 10, the first mesh screen 11 rests more particularly over each of the ribs 221 of the second pattern 22, and in particular over their tops, by a portion of its meshing 112, when printing the third layer 33.

It should be further noted that, as illustrated in FIG. 11, the deposition of the third electrically-conductive ink layer 33 may also lead to an additional enlargement of the ribs in comparison with the height of the ribs 221 of the second pattern 22. Nonetheless, this enlargement is limited by the thickness of the meshing 112 of the first mesh screen 11.

It turns out that it is then possible to make the ribs 222 grow, by doubling, by tripling, and even by quadrupling, their height, by repeating the sequence of the following steps as many times as possible:

positioning the second mesh screen 12 so that it partially rests over each of the enlarged ribs 222, then printing another layer of an electrically-conductive ink by screen-printing using the second mesh screen 12 as positioned before, so as to obtain, after drying, a superimposition of the second pattern over the enlarged ribs 22, then positioning the first mesh screen 11 so that it partially rests over each of the ribs of the second pattern printed before, the openings 111 of the first mesh screen 11 being partially occupied by at least one portion of the ribs of the second pattern superimposed with the enlarged ribs 222, and preferably substantially centred on said ribs of the second pattern, and printing another layer of an electrically-conductive ink by screen-printing using the first mesh screen 11 as positioned before.

Each repetition of the sequence of steps listed hereinabove enables an enlargement of the ribs by a height substantially equal to that of the enlarged ribs 222, without any tradeoff on the width of the upper levels of the ribs.

For example, these variants of the pyramidal printing technique described hereinabove are called "pyramidal print(s) by alternation".

Such a technique of pyramidal prints by alternation allows increasing the height of the ribs and at the same time ensuring a good support to each mesh screen used to print a new ink layer, by adding at least one step of printing using the first mesh screen 11, or alternatively a mesh screen with a very close opening width. At each alternation, the fine ribs 221 already added over the first pattern 21 are completed with a new supply 33 if electrically-conductive ink.

Thus, ribs 222 having substantially the same width as the width of the ribs 211 of the first pattern are obtained. It is then possible to start again and stack layers starting always from the same width of ribs, without having to have more than two mesh screens (or equivalently screen-printing masks) and without being limited by the width of the first formed ribs 211 (in contrast with the so-called pyramidal printing technique described hereinabove).

In particular, such enlarged ribs 222 have, with respect to the ribs 221 of the second pattern 22, a better mechanical strength and a larger contact surface, in particular electrical contact, with other components of the electrochemical reactor that are intended to be assembled on the first flow-guide 1, in one of the manner illustrated and discussed hereinbelow with reference to FIGS. 12 to 20.

In each of FIGS. 6 to 11, the use of different textures to illustrate each used ink shows that each printing step could be carried out with an electrically-conductive ink that is specific thereto. Thus, each enlarged rib 222 may be formed from one, two or three electrically-conductive inks. Thus, it is possible to tune the composition(s) of the printed electrically-conductive inks, for example to vary their electrical conductivity quality, their mechanical strength quality, or the manufacturing cost associated to the implementation of the method according to the different variants of the first aspect of the invention.

More particularly, the possibility of making the formulation of the ink of each of the layers vary allows, for example:

making the wet angle of the tooth vary along its height, in order to improve the evacuation of water out of the electrochemical cell in which the flow-guide 1 is intended to be integrated, and/or the finest deposition (that of the ribs 221 of the second pattern 22 in the example illustrated in FIG. 11) to have different mechanical characteristics, such as a greater rigidity or a better cohesion, where appropriate, at the expense of its electrical conductivity, and/or the finest deposition (that of the ribs 221 of the second pattern 22 in the example illustrated in FIG. 11) to possibly contain elements (for example metallic particles) that are barely compatible with the surrounding environment of the fuel cell to which it is intended to be integrated, since this deposition is encapsulated (in particular by at least three of its sides as illustrated in FIG. 11) by the widest deposition (that of the third layer 33), and if the widest deposition is protective enough.

Thus, the invention offers an advantageous possibility for variation of the electrically-conductive inks to be printed. Nonetheless, it is preferable that each of these inks could be said to have a very high thixotropy. More particularly, such an ink could be characterised by the fact that its printing by screen-printing could effectively be carried out by applying a shear stress thereto, as illustrated in FIG. 4, the ink having:

a viscosity substantially comprised between 70 and 500 Pa·s when a shear rate substantially equal to $0.1$ $s^{-1}$ is applied thereto, and a viscosity substantially comprised between 2.5 and 7 Pa·s when a shear rate substantially equal to $100$ $s^{-1}$ is applied thereto.

Another parameter relating to the flow-guide 1 manufactured by implementing the method according to the first aspect of the invention relates to the width of the flow channels 2. The latter is defined, according to the above-described embodiments, by the first mesh screen 11. Indeed, the emulsion 113 of the first mesh screen 11 has a pattern which is the negative of the first pattern 21 of the ribs 211 and which defines between these, the width of the flow channels 2 of the guide 1. Moreover, it should be reminded that the width of the ribs 211 of the first pattern 21 is defined by the openings 111 of the first mesh screen 11. Hence, it turns out, in particular when the first mesh screen 11 defines ribs 211 having a shape factor (between the width and the height) substantially equal to 1 and flow channels 2 with a width substantially equal to the width of the ribs 211, that the width of the flow channels 2 could, through the implementation of the method according to the first aspect of the invention, ultimately be substantially comprised between 1 and 4 times the width of the ribs 211 of the first pattern 21, preferably substantially comprised between 1 and 2 times the width of the ribs 211 of the first pattern 21, and still more preferably substantially equal to the width of the ribs 211 of the first pattern 21. Thus, since the shape factor between the width and the depth of the flow channels 2 is no longer limited to 1 thanks to the manufacturing method according to the first aspect of the invention, reducing the width of the tooth/channel step, reference P in FIG. 11, does not ineluctably lead to a reduction of the depth of the flow channels 2. Hence, the technological obstacle that has so far limited the interest of printed fluidic circuits is advantageously overcome thanks to the different variants described hereinabove of the manufacturing method according to the first aspect of the invention.

Figure 12:
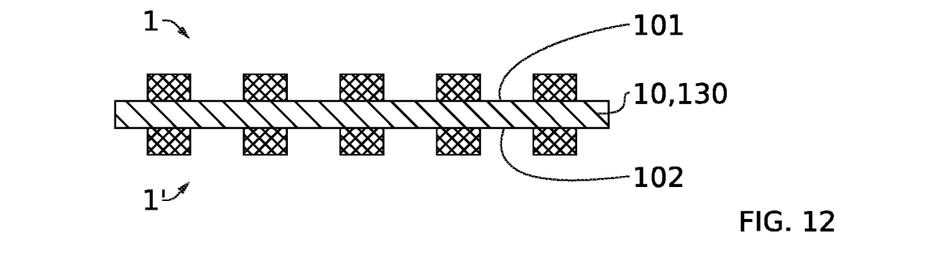
FIGS. 12 to 14 illustrate, each, a schematic sectional view of an example of configuration of a flow-guide obtained by implementing an embodiment of the manufacturing method according to the first aspect of the invention.
Figure 13:
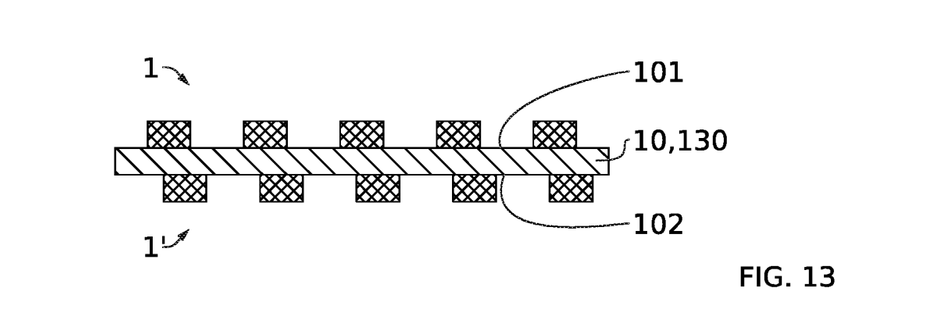
Figure 14:
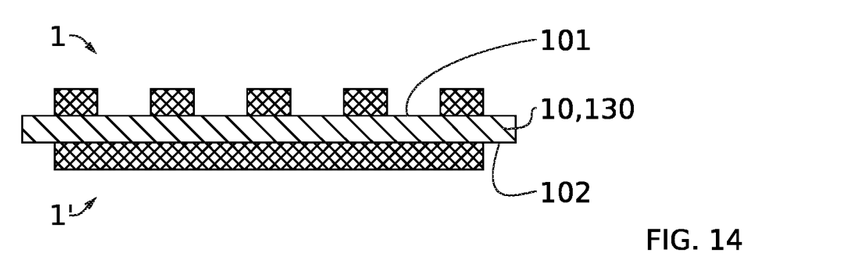

It is further possible to repeat the manufacturing method according to the first aspect of the invention on the face 102 of the substrate 10, so as to manufacture over this face 102 a second flow-guide 1', for example in one of the manners illustrated in FIGS. 12 to 14. It should be noted herein that these embodiments are more particularly suited for a substrate comprising, or being made of, a mere electrically-conductive plate 130, in contrast with an electrode layer 110 and a gas-diffusion layer 120 of the electrochemical reactor.

For example, such an electrically-conductive plate 130 may be made based on a metal selected, for example, amongst stainless steel, aluminium, or titanium. For example, the metal may be protected by a carbonated or metallised deposition or an electron-conductive composite polymer including a metallisation layer, to protect the plate 130 against corrosion or to reduce contact resistances. The plate 130 may be substantially rigid. Preferably, it has a thickness comprised between 0.01 and 1 mm, more preferably comprised between 0.02 and 0.1 mm.

In the example illustrated by FIG. 12, a first flow-guide 1 has been manufactured by implementing the method according to the first aspect of the invention over an upper face 201 of the electrically-conductive plate 130 and a second flow-guide 1' has been manufactured over a lower face 202 of the plate 130. Thus, flow channels are formed on either side of the plate 130 between the ribs. In this example, the ribs of the two opposite faces extend parallel, have the same dimensions and are superimposed: the ribs of the two faces are the symmetric of one another with respect to the plate 130.

In the example illustrated by FIG. 13, the ribs of the two opposite faces extend parallel and have the same dimensions, but are shifted according to a direction transverse to their main direction of extension.

In the example of FIG. 14, the ribs of the two opposite faces extend according to perpendicular directions.

These examples are intended to show that any variation between a first flow-guide 1 manufactured over the first face 101 of the substrate 10 and the a second flow-guide 1' manufactured over the second face 102 of the substrate 10 could be considered, the manufacture of one of the flow-guides 1 and 1' according to any one of the variants of the first aspect of the invention not constraining the manufacture of the other one according to any one of the variants of the first aspect of the invention. For example, each of the first and second flow guides 1 and 1' manufactured on either side of the same plate 130 may feature any mode amongst the three circulation modes described hereinabove.

An example of implementation of the method according to the first aspect of the invention enables the manufacture of a conductive fluidic circuit having:

A tooth 222 width of 400 µm,
A channel 2 width of 400 µm, and
A tooth height of 400 µm.

To this end, the first mesh screen 11 may have an emulsion thickness 113 of 200 µm and an opening width 111 of the patterns of 400 µm, and the second mesh screen 12 may have an emulsion thickness 123 of 200 µm and an opening width 121 of the patterns of 300 µm.

The first printing step allows forming 400 µm-wide and 200 µm-high teeth 211. The second and third printing steps allow forming 400 micron-wide and 400 µm-high enlarged teeth 222.

A second aspect of the invention relates to a method for manufacturing a bipolar plate, in particular intended for a PEM application. First of all, the manufacturing method according to the second aspect of the invention comprises the implementation of one of the above-described variants of the manufacturing method according to the first aspect of the invention. Afterwards, it consists in assembling together a plurality of flow-guides 1, 1' manufactured in this manner. Examples of such bipolar plates 3 are illustrated in each of FIGS. 15 and 16.

Figure 15:
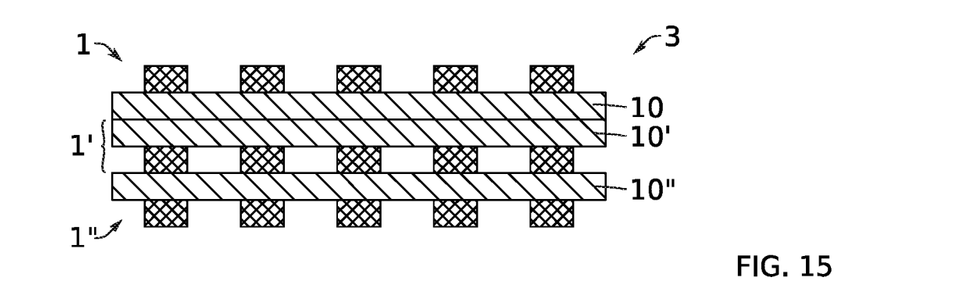
FIGS. 15 and 16 illustrate, each, a schematic sectional view of an example of configuration of a bipolar plate obtained by implementing an embodiment of the manufacturing method according to the second aspect of the invention.

FIG. 15 illustrates a bipolar plate 3, formed by the superimposition of flow-guides 1, 1' and 1" obtained by implementing one of the variants described hereinabove of the manufacturing method according to the first aspect of the invention. In this example, three flow-guides 1, 1' and 1" are manufactured from three substrates 10, 10' and 10". These three flow-guides include ribs over one single face. The upper guide 1 has ribs projecting from the upper face of the substrate 10. The intermediate guide 1' and the lower guide 1" have ribs 31 projecting from the lower faces of the substrates 10' and 10" respectively. When these three guides 1, 1' and 1" are superimposed, flow channels of a reagent are mixed between the ribs of the upper guide 1, flow channels of a heat-transfer liquid are mixed between the ribs of the intermediate guide 1', and flow channels of another reagent are mixed between the ribs of the lower guide 1".

Figure 16:
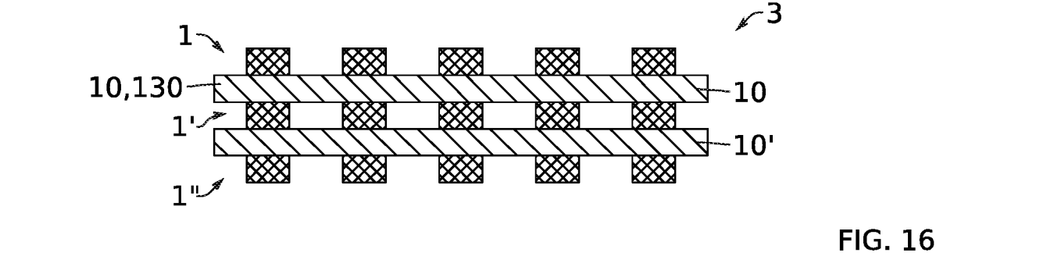

FIG. 16 illustrates a bipolar plate 3, formed by superimposition of flow-guides 1, 1' and 1" manufactured from two substrates 10 and 10' by implementing one of the variants described hereinabove of the manufacturing method according to the first aspect of the invention. In this example, three flow-guides 1, 1' and 1" are superimposed. The upper guide 1 and the intermediate guide 1' share the same substrate 10 and form a configuration as illustrated in FIG. 4 wherein the substrate 10 is a mere electrically-conductive plate 130. Hence, this plate 130 as illustrated includes ribs projecting from both of its faces. The lower guide 1" has ribs projecting from the lower face of the substrate 10'. Like in FIG. 15, when the three guides 1, 1' and 1" are superimposed, flow channels of a reagent are mixed between the ribs of the upper guide 1, flow channels of a heat-transfer liquid are formed between the ribs of the intermediate guide 1', and flow channels of another reagent are mixed between the ribs of the lower guide 1".

Figure 17:
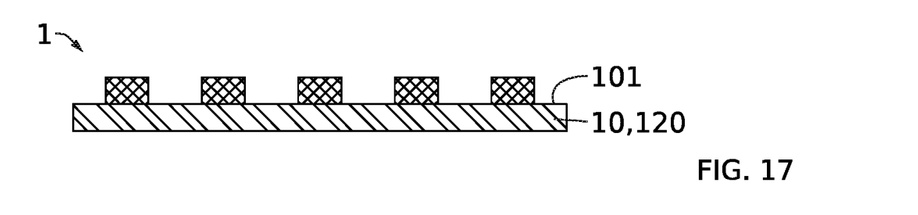
FIG. 17 illustrates a schematic sectional view of an example of configuration of a flow-guide obtained by implementing an embodiment of the manufacturing method according to the first aspect of the invention.

FIG. 17 is a schematic sectional view of a flow-guide according to another embodiment of the invention. The substrate 10 over which the electrically-conductive ink layer has been printed by screen-printing is herein a gas-diffusion layer 120. The ink may be printed over one face 101 of the gas-diffusion layer 120, with printing parameters similar to those described hereinabove. A flow-guide 1 is obtained, over the gas-diffusion layer 120, by implementation of one of the variants described hereinabove of the manufacturing method according to the first aspect of the invention.

Figure 18:
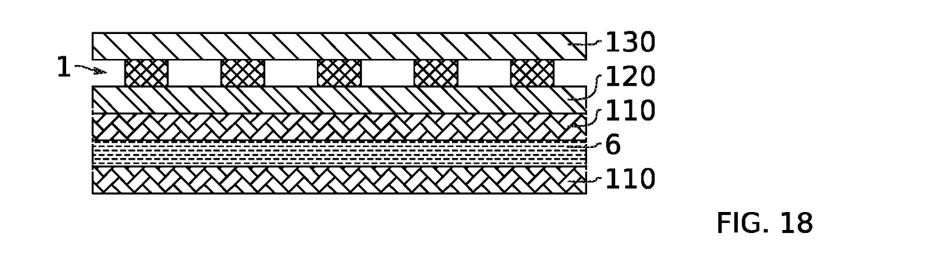
FIG. 18 illustrates an association of a flow-guide of FIG. 17 with other components of an electrochemical reactor.

FIG. 18 is a schematic sectional view of a flow-guide 1 obtained by implementing one of the variants described hereinabove of the manufacturing method according to the first aspect of the invention, associated to other components of an electrochemical reactor. An electrically-conductive plate 130, like that detailed in the embodiments described with reference to FIGS. 12 to 14, could be pressed against the top of the ribs of a flow-guide 1. A membrane-electrodes assembly, including a membrane 6 and two electrodes 110, is pressed against a lower face of a gas-diffusion layer 120 supporting the ribs of the flow-guide.

Figure 19:
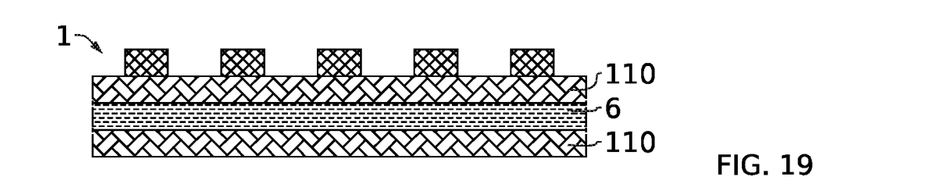
FIG. 19 illustrates a schematic sectional view of an example of configuration of a flow-guide obtained by implementing an embodiment of the manufacturing method according to the first aspect of the invention.

FIG. 19 is a schematic sectional view of a flow-guide 1 obtained by implementing one of the variants described hereinabove of the manufacturing method according to the first aspect of the invention, associated to other components of an electrochemical reactor. The substrate 110 over which at least the first two electrically-conductive ink layers 31 and 32 have been printed by screen-printing is herein an electrode 110 secured, before or after printing, to a proton-exchange membrane 6 of a membrane-electrodes assembly. The ink may be printed over a face of the electrode 110, with printing parameters similar to those described hereinabove.

Figure 20:
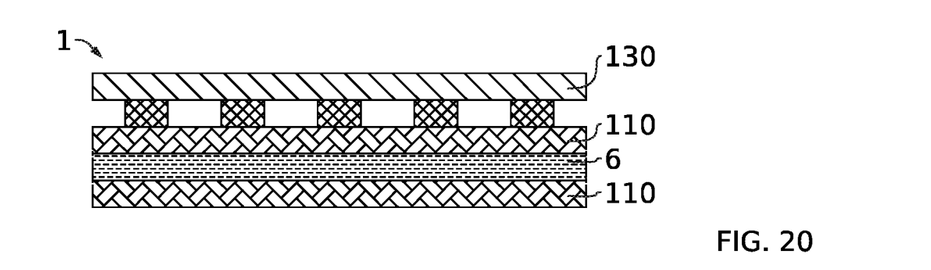
FIG. 20 illustrates an association of the flow-guide of FIG. 19 with another component of an electrochemical reactor.

FIG. 20 is a schematic sectional view of the assembly illustrated in FIG. 19, associated to another component of an electrochemical reactor, namely an electrically-conductive plate 130. The latter, which may be like in the embodiments described with reference to FIGS. 12 to 14, could be pressed against the top of the ribs extending from the surface of one of the electrodes 110.

The invention is not limited to the previously-described embodiments.

For example, each electrically-conductive ink layer 31, 32 and 33 may be printed several times, each then forming a multilayer. This could allow increasing the density of the depositions and/or their height. In this case, the drying phase is repeated as many times as there are layers in each multilayer.

It should be noted herein that the drying phases could for example be carried out in an oven at a temperature substantially equal to 80° C. for a time period substantially equal to 10 minutes.

The present invention may be applied to any type of electrochemical reactors requiring at least one fluidic circuit, in particular for the feed-in of reagents and the evacuation of the products of the reaction and/or the circulation of a cooling fluid. Amongst these electrochemical reactors, mention may be made not only of fuel cells, as already mentioned hereinabove, but also, as an additional example, of electrolysers.

Finally, it should be noted that the present invention enables the manufacture of a fluidic circuit having fine flow channels, i.e. having a width smaller than 400 µm, which cannot be made on a large scale by stamping.

The invention claimed is:

1. A method for manufacturing at least one flow-guide for an electrochemical reactor, comprising the following steps:
   a. providing a substrate,
   b. providing a first mesh screen comprising openings configured to form a first pattern of ribs of a first flow-guide,
   c. providing a second mesh screen comprising openings configured to form a second pattern of ribs of the first flow-guide,
   the second pattern being configured such that, when the second mesh screen is superimposed with the first mesh screen, the openings of the second mesh screen can be positioned so that each is located simultaneously with other openings of the second mesh, in line with an opening of the first mesh screen and the openings of the second mesh screen having a reduced surface in comparison with the openings of the first mesh screen; then on a first face of the substrate
   d. printing a first layer of a first electrically-conductive ink by screen-printing using the first mesh screen,
   e. forming the first pattern of ribs by drying the first layer,
   f. positioning the second mesh screen so that it partially rests over each of the ribs of the first pattern, each opening of the second mesh screen being positioned in line with a rib of the first pattern, then
   g. printing a second layer of a second electrically-conductive ink by screen-printing using the second mesh screen as positioned in step f,
   so as to obtain a superimposition of the second pattern over the first pattern after drying of the second layer,
   the method further comprising the following steps:
   h. positioning the first mesh screen so that it partially rests over each of the ribs of the second pattern, the openings of the first mesh screen being partially occupied by at least one portion of the ribs of the second pattern, and
   i. printing a third layer of a third electrically-conductive ink by screen-printing using the first mesh screen as positioned in step h,
   so as to obtain at least one enlargement of the ribs of the second pattern and consequently enlarged ribs, after drying of the third ink layer.

2. The method according to claim 1, wherein the openings of the second mesh screen are configured and positioned so as to be able to be substantially centred on the ribs of the first pattern when positioning the second mesh screen.

3. The method according to claim 1, further comprising at least once the sequence of the following steps:
   j. positioning the second mesh screen so that it partially rests over each of the enlarged ribs, then
   k. printing another layer of an electrically-conductive ink by screen-printing using the second mesh screen as positioned in step j, so as to obtain, after drying, a superimposition of the second patter over the enlarged ribs, then
   l. positioning the first mesh screen so that it partially rests over each of the ribs of the second pattern printed before, the openings of the first mesh screen being partially occupied by at least one portion of the ribs of the second pattern superimposed with the enlarged ribs, and
   m. printing another layer of an electrically-conductive ink by screen-printing using the first mesh screen as positioned in step l,
   so as to obtain, after drying, a second enlargement of the ribs of the second pattern.

4. The method according to claim 1, wherein a surface difference between the openings of the second mesh screen and the openings of the first mesh screen is such that, when the second mesh screen is positioned over the first pattern, the second mesh screen rests over 5 to 20% of an upper surface of the ribs of the first pattern.

5. The method according to claim 1, wherein a surface difference between the openings of the second mesh screen and the openings of the first mesh screen comprises a width difference between the openings of the second mesh screen and the openings of the first mesh screen which is larger than 40 µm.

6. The method according to claim 1, wherein, each mesh screen comprising a meshing and an emulsion, the second mesh screen is positioned over the first pattern, so that a portion of the emulsion of the second mesh screen rests partially over each of the ribs of the first pattern.

7. The method according to claim 1, wherein, each mesh screen comprising a meshing and an emulsion, the first mesh screen is positioned over the second pattern so that a portion of the meshing of the first mesh screen rests over each of the ribs of the second pattern.

8. The method according to claim 1, wherein, each mesh screen comprising a meshing and an emulsion, at least one of
the emulsion has a thickness substantially comprised between 100 and 200 μm, and
the meshing has a thickness substantially comprised between 50 and 150 μm.

9. The method according to claim 1, wherein, the first mesh screen comprising a meshing and an emulsion, the emulsion of the first mesh screen having a pattern which is a negative of the first pattern and which defines flow channels of the first guide between the ribs of the first pattern whose width is defined by the openings of the first mesh screen, the width of the flow channels is substantially comprised between 1 and 4 times the width of the ribs of the first pattern.

10. The method according to claim 1, wherein each printing by screen-printing of each layer of electrically-conductive ink is carried out while applying a shear stress on each layer, a viscosity of the printed ink being comprised between 70 and 500 Pa·s for a shear rate of $0.1\ s^{-1}$, and the viscosity of the printed ink being comprised between 2.5 and 7 Pa·s for a shear rate of $100\ s^{-1}$.

11. The method according to claim 1, wherein the provided substrate comprises at least one amongst a gas-diffusion layer of the electrochemical reactor, an electrode layer of the electrochemical reactor and an electrically-conductive plate.

12. The method according to claim 1, wherein, the provided substrate being an electrically-conductive plate, steps d to i of the method are repeated on a second face of the substrate to manufacture a second flow-guide therein.

13. The method according to claim 12, further comprising at least once the sequence of the following steps:
j. positioning the second mesh screen so that it partially rests over each of the enlarged ribs, then
k. printing another layer of an electrically-conductive ink by screen-printing using the second mesh screen as positioned in step j, so as to obtain, after drying, a superimposition of the second pattern over the enlarged ribs, then
l. positioning the first mesh screen so that it partially rests over each of the ribs of the second pattern printed before, the openings of the first mesh screen being partially occupied by at least one portion of the ribs of the second pattern superimposed with the enlarged ribs, and
m. printing another layer of an electrically-conductive ink by screen printing using the first mesh screen as positioned in step l,
so as to obtain, after drying, a second enlargement of the ribs of the second pattern,
wherein steps j to m are repeated on the second face of the substrate to manufacture the second flow-guide therein.

14. A method for manufacturing a bipolar plate for an electrochemical reactor, comprising:
manufacturing, by a manufacturing method according to claim 1, of at least three flow-guides on at least two substrates, and
forming an assembly of the at least two substrates together so that the assembly has one of said at least three flow-guides between two of said at least two substrates and two other ones of said at least three flow-guides on either side of said at least two substrates.

15. A flow-guide for an electrochemical reactor manufactured according to claim 1, comprising the substrate over at least the first face of which extend the ribs, the ribs defining flow channels, the ribs being made based on at least one electrically-conductive material different from a material of the substrate and having a thickness strictly larger than a width of the flow channels, wherein each rib extends from the first face of the substrate by at least one first portion made based on a first conductive material different from the material of the substrate, at least one second portion extending from the first portion, with a reduced width in comparison with a width of the first portion of each rib and made based on a second conductive material different from the material of the substrate, the second conductive material being different from the first conductive material, and a third portion extending from at least one side of the second portion, until covering, the second portion, the third portion having at least one of a width substantially equal to the width of the first portion and extending in line with the first portion, the third portion being made based on a third conductive material, the third conductive material being different from at least one amongst the first conductive material and the second conductive material.

* * * * *